(12) United States Patent
Lee

(10) Patent No.: US 7,567,326 B2
(45) Date of Patent: Jul. 28, 2009

(54) IPS MODE LIQUID CRYSTAL DISPLAY DEVICE HAVING AN ALIGNMENT LAYER ON A PLURALITY OF PIXEL ELECTRODES

(75) Inventor: Yun-Bok Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/985,908

(22) Filed: Nov. 12, 2004

(65) Prior Publication Data

US 2005/0088601 A1 Apr. 28, 2005

Related U.S. Application Data

(62) Division of application No. 10/067,845, filed on Feb. 8, 2002, now Pat. No. 6,833,896.

(30) Foreign Application Priority Data

Feb. 12, 2001 (KR) .................................. 2001-6819

(51) Int. Cl.
*G02F 1/1343* (2006.01)
*G02F 1/1345* (2006.01)
(52) U.S. Cl. ......................... 349/141; 349/149; 349/151
(58) Field of Classification Search .................. 349/42, 349/43, 123, 141; 257/59, 72
See application file for complete search history.

(56) References Cited

U.S. PATENT DOCUMENTS 5,598,285 A 1/1997 Kondo et al.

(Continued)

FOREIGN PATENT DOCUMENTS

JP 09-005764 1/1997

(Continued)

OTHER PUBLICATIONS

R. Kiefer et al.; "In-Plane Switching of Nematic Liquid Crystals"; Japan Display '92; pp. 547-550.

(Continued)

*Primary Examiner*—Michael H Caley
(74) *Attorney, Agent, or Firm*—McKenna Long & Aldridge LLP

(57) ABSTRACT

In a method of forming an array substrate for in-plane switching liquid crystal display device a first metal layer is formed on a substrate and then patterned using a first mask so as to form a gate line having a gate electrode and a common line having a plurality of common electrodes. A gate insulation layer is formed on the substrate to cover the patterned first metal layer. A semiconductor layer is formed on the gate insulation layer using a second mask, wherein the semiconductor layer includes an active layer of pure amorphous silicon and an ohmic contact layer of impurity-doped amorphous silicon. A second metal layer is formed on the gate insulation layer to cover the semiconductor layer and then patterned using a third mask to form a data line having a source electrode, a pixel connecting line having a plurality of pixel electrodes, and a drain electrode that is spaced apart from the source electrode. A channel is formed by etching a portion of the ohmic contact layer between the source and drain electrodes. An alignment layer is formed over the substrate to cover the patterned second metal layer. The substrate having the alignment layer and the source and drain electrode is then thermal-treated in a furnace to cure the alignment layer and to anneal a thin film transistor.

4 Claims, 16 Drawing Sheets

U.S. PATENT DOCUMENTS

| | | | | |
|---|---|---|---|---|
| 5,825,449 | A * | 10/1998 | Shin | 349/148 |
| 5,838,037 | A | 11/1998 | Masutani et al. | |
| 5,907,379 | A * | 5/1999 | Kim et al. | 349/141 |
| 5,923,072 | A * | 7/1999 | Wada et al. | 257/473 |
| 5,946,060 | A | 8/1999 | Nishiki et al. | |
| 5,990,987 | A | 11/1999 | Tanaka | |
| 6,028,653 | A | 2/2000 | Nishida | |
| 6,081,308 | A * | 6/2000 | Jeong et al. | 349/42 |
| 6,097,454 | A | 8/2000 | Zhang et al. | |
| 6,100,954 | A * | 8/2000 | Kim et al. | 349/138 |
| 6,130,737 | A * | 10/2000 | Aratani et al. | 349/138 |
| 6,133,977 | A * | 10/2000 | Lee et al. | 349/141 |
| 6,255,130 | B1 * | 7/2001 | Kim | 438/30 |
| 6,297,866 | B1 * | 10/2001 | Seo et al. | 349/141 |
| 6,388,727 | B1 * | 5/2002 | Kim et al. | 349/141 |
| 6,392,720 | B1 * | 5/2002 | Kim | 349/42 |
| 6,407,791 | B1 * | 6/2002 | Suzuki et al. | 349/129 |
| 6,466,289 | B1 * | 10/2002 | Lee et al. | 349/141 |
| 6,577,368 | B1 * | 6/2003 | Yuh et al. | 349/141 |
| 6,624,864 | B1 * | 9/2003 | Kubo et al. | 349/139 |
| 6,642,988 | B2 * | 11/2003 | Matsuyama et al. | 349/156 |
| 6,678,018 | B2 * | 1/2004 | Park et al. | 349/43 |
| 6,849,873 | B2 * | 2/2005 | Baek et al. | 257/72 |
| 2001/0013915 | A1 * | 8/2001 | Song | 349/141 |
| 2001/0040647 | A1 * | 11/2001 | Song et al. | 349/43 |
| 2001/0040648 | A1 * | 11/2001 | Ono et al. | 349/43 |
| 2001/0040661 | A1 * | 11/2001 | Ohta et al. | 349/141 |
| 2002/0140891 | A1 * | 10/2002 | Tomioka et al. | 349/141 |
| 2004/0057003 | A1 * | 3/2004 | Yoo et al. | 349/141 |

FOREIGN PATENT DOCUMENTS

| | | |
|---|---|---|
| JP | 09-073101 | 3/1997 |
| JP | 09-101538 | 4/1997 |
| JP | 09-105908 | 4/1997 |

OTHER PUBLICATIONS

M. Oh-e, et al.; "Principles and Characteristics of Electro-Optical Behavior with In-Plane Switching Mode"; Asia Display '95; pp. 577-580.

M. Ohta et al.; "Development of Super-TFT-LCDs with In-Plane Switching Display Mode"; Asia Display '95; pp. 707-710.

S. Matsumoto et al.; Display Characteristics of In-Plane Switching (IPS) LCDs and a Wide-Viewing-Angle 14.5-in. IPS TFT-LCD; Euro Display '96; pp. 445-448.

H. Wakemoto et al.; "An Advanced In-Plane Switching Mode TFT-LCD"; SID 97 Digest; pp. 929-932.

S.H. Lee et al.; High-Transmittance, Wide-Viewing-Angle Nematic Liquid Crystal Display Controlled by Fringe-Field Switching; Asia Display '98; pp. 371-374.

* cited by examiner

IPS MODE LIQUID CRYSTAL DISPLAY DEVICE HAVING AN ALIGNMENT LAYER ON A PLURALITY OF PIXEL ELECTRODES

This application is a divisional of application Ser. No. 10/067,845, filed Feb. 8, 2002 now U.S. Pat. No.6,833,896 which claims priority to Korean Patent Application No. 2001-6819, filed Feb. 12, 2001, each of which are incorporated by reference for all purposes as if fully set forth herein.

BACKGROUND OF THE INVENTION

1. Field of the Invention

The present invention relates to liquid crystal display devices. More particularly it relates to liquid crystal display devices implanting in-plane switching (IPS) where an electric field to be applied to liquid crystals is generated in a plane parallel to a substrate.

2. Discussion of the Related Art

A liquid crystal display device uses the optical anisotropy and polarization properties of liquid crystal molecules to produce an image. Liquid crystal molecules have a definite orientational alignment as a result of their long, thin shapes. That orientational alignment can be controlled by an applied electric field. In other words, as an applied electric field changes, so does the alignment of the liquid crystal molecules. Due to the optical anisotropy, the refraction of incident light depends on the orientational alignment of the liquid crystal molecules. Thus, by properly controlling an applied electric field a desired light image can be produced.

Of the different types of known LCDs, active matrix LCDs (AM-LCDs), which have thin film transistors and pixel electrodes arranged in a matrix form, are the subject of significant research and development because of their high resolution and superiority in displaying moving images.

LCD devices have wide application in office automation (OA) equipment and video units because they are light and thin and have low power consumption characteristics. The typical liquid crystal display (LCD) panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors (TFTs) and pixel electrodes.

As previously described, LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

In a conventional LCD device, since the pixel and common electrodes are positioned on the lower and upper substrates, respectively, the electric field induced between them is perpendicular to the lower and upper substrates. However, the conventional LCD devices having the longitudinal electric field have a drawback in that they have a very narrow viewing angle. In order to solve the problem of narrow viewing angle, in-plane switching liquid crystal display (IPS-LCD) devices have been proposed. The IPS-LCD devices typically include a lower substrate where a pixel electrode and a common electrode are disposed, an upper substrate having no electrode, and a liquid crystal interposed between the upper and lower substrates. A detailed explanation about operation modes of a typical IPS-LCD panel will be provided referring to FIGS. 1, 2A, and 2B.

FIG. 1 is a schematic cross-sectional view illustrating a concept of a conventional IPS-LCD panel. As shown in FIG. 1, upper and lower substrates 10 and 20 are spaced apart from each other, and a liquid crystal layer 30 is interposed therebetween. The upper and lower substrates 10 and 20 are often referred to as an array substrate and a color filter substrate, respectively. On the lower substrate 20 are a common electrode 22 and a pixel electrode 24. The common and pixel electrodes 22 and 24 are aligned parallel to each other. On a surface of the upper substrate 10, a color filter layer (not shown) is commonly positioned between the pixel electrode 24 and the common electrode 22 of the lower substrate 20. A voltage applied across the common and pixel electrodes 22 and 24 produces an electric field 26 through the liquid crystal 32. The liquid crystal 32 has a positive dielectric anisotropy, and thus it aligns parallel to the electric field 26.

FIGS. 2A and 2B conceptually help illustrate the operation of a conventional IPS-LCD device. When no electric field is produced by the common and pixel electrodes 22 and 24, i.e., off state, as shown in FIG. 2A, the longitudinal axes of the liquid crystal (LC) molecules 32 are parallel and form a definite angle with the common and pixel electrodes 22 and 24. For example, the longitudinal axes of the LC molecules 32 are arranged parallel with both the common and pixel electrodes 22 and 24.

On the contrary, when an electric voltage is applied to the common and pixel electrodes 22 and 24, i.e., on state, as shown in FIG. 2B, because the common and pixel electrodes 22 and 24 are on the lower substrate 20, an in-plane electric field 26 that is parallel to the surface of the lower substrate 20 is produced. Accordingly, the LC molecules 32 are re-arranged to bring their longitudinal axes into coincidence with the electric field. However, the first LC molecules 32a positioned corresponding to the common and pixel electrodes 22 and 24 do not change their orientation, while the second LC molecules 32b positioned between the common and pixel electrodes 22 and 24 are arranged perpendicular to the common and pixel electrodes 22 and 24. Therefore, the result is a wide viewing angle that ranges from about 80 to 85 degrees in up-and-down and left-and-right sides from a line vertical to the IPS-LCD panel, for example.

FIG. 3 is a plan view illustrating one pixel of an array substrate according to a conventional IPS-LCD device. As shown, a gate line 66 is transversely arranged and a data line 70 is disposed substantially perpendicular to the gate line 66. A pair of gate and data lines 66 and 70 define a pixel region on the array substrate. An island-shaped semiconductor layer 84 is positioned near the crossing of the gate and data lines 66 and 70, thereby forming a thin film transistor (TFT) "T" with a gate electrode 80, a source electrode 86 and a drain electrode 88. The gate electrode 80 extends from the gate line 66, and the source electrode 86 extends from the data line 70. The drain electrode 88 is connected to a pixel connecting line 72 that connects a plurality of pixel electrodes 74 to each other. A common line 64 is spaced apart from the gate line 66 and disposed parallel with the gate line 66. A plurality of common electrodes 62 protrude from the common line 64 and are disposed parallel to each of the pixel electrodes 74, so that each common electrode 62 is spaced apart from the adjacent pixel electrodes 64 with a predetermined interval therebetween.

At the ends of the gate and data lines 66 and 70, gate and data pads 67 and 71 are respectively positioned for a connection with the external driving circuits (not shown). A gate pad electrode 75 and a data pad electrode 77 are disposed on the gate pad 67 and the data pad 71, respectively. A gate pad contact hole 83 and a data pad contact hole 73 are formed over the gate pad electrode 75 and the data pad electrode 77, respectively, to expose those electrodes for the connection with the external driving circuits.

FIGS. 4A to 4G, 5A to 5G and 6A to 6G are cross-sectional views taken along line IV-IV, V-V and VI-VI of FIG. 3, respectively illustrating process steps of manufacturing the array substrate of a conventional IPS-LCD. FIGS. 4A to 4G show the steps of forming the thin film transistor; FIGS. 5A to 5G show the steps of forming the common and pixel electrodes; and FIGS. 6A to 6G show the steps of forming the gate pad.

In FIGS. 4A, 5A and 6A, a first metal layer is deposited on a substrate 1 using sputtering and then patterned using a first mask to form a gate electrode 80, a common electrode 62, and a gate line 66 having a gate pad 67 at an end of the gate line 66. Although not shown in FIGS. 4A, 5A and 6A, the common line 64 of FIG. 3 is formed with the gate line 66. Aluminum, tungsten, tantalum, titanium or the alloy thereof is mainly used for the first metal layer.

Now referring to FIGS. 4B, 5B and 6B, after the anodically oxidized mask is formed by the direct drawing, the substrate 1 having the patterned first metal layer is immersed in an anodically oxidizing solution, e.g., a solution prepared of 3% tartaric acid with a pH value adjusted to about 6.25 with ammonia. Then, anodic oxidation is carried out to form an $Al_2O_3$ film 81 having a predetermined thickness. As illustrated in FIGS. 4B, 5B and 6B, the $Al_2O_3$ film 81 is disposed on the gate electrode 80, the common electrode 62 and the gate line 66, but the $Al_2O_3$ film 81 is not disposed on the gate pad 67 or in a pad portion "I." In the direct drawing, the mask is directly printed on the surface of the pad portion "I." Therefore, the Al2O3 film 81 is formed using the anodic oxidation on the surface of the patterned first metal except for the pad portion "I."

In FIGS. 4C, 5C and 6C, a transparent conductive material, such as Indium Tin Oxide (ITO), is formed over the substrate and then patterned using a second mask to form a gate pad electrode 75. As shown in FIG. 6C, the gate pad electrode 75 is disposed in the pad portion "I" and acts to decrease contact resistance between the gate pad 67 and the external driving circuits that will be connected in a later step.

Next, as shown in FIGS. 4D, 5D and 6D, a gate insulation layer 82 is formed over the substrate 1 to cover the gate electrode 81, the common electrode 62, the gate line 66 and the gate pad 67. The gate insulation layer 82 is usually made of silicon nitride ($SiN_x$) or silicon oxide ($SiO_2$) and deposited on the substrate 1 using a Plasma Enhanced Chemical Vapor Deposition (PECVD). Thereafter, a pure amorphous silicon (a-Si:H) and an impurity-doped amorphous silicon ($n^+$a-Si:H) are sequentially formed on the gate insulation layer and then simultaneously patterned to form an active layer 84a and an ohmic contact layer 84b over the gate electrode 80. The ohmic contact layer 84b drops the contact resistance between the active layer 84a and the later formed source and drain electrodes.

Referring to FIGS. 4E, 5E and 6E, a portion of the gate insulation layer 82 is etched using a fourth mask to form a first gate pad contact hole 83a. The first gate pad contact hole 83a exposes a portion of the gate pad electrode 75 and connects the gate pad 67 to the external driving circuits therethrough.

In FIGS. 4F, 5F and 6F, a second metal layer and a third metal layer are sequentially formed on the gate insulation layer 82 and then patterned using a fifth mask to form a source electrode 86, a drain electrode 88 and a pixel electrode 74. At this time, the data line 70, data pad 71 and pixel connecting line 72 of FIG. 3 are also formed with the source and drain electrodes 86 and 88. The second metal layer is a material selected from chromium (Cr), molybdenum (Mo), tungsten (W) and the like. The third metal layer is formed of a material selected from aluminum, tungsten, tantalum, palladium and an alloy thereof.

A portion of the ohmic contact layer 84b disposed on the active layer 84a is etched using the source and drain electrodes 86 and 88 as masks, thereby forming a channel "CH" in an interval between the source electrode 86 and the drain electrodes 88 as shown in FIG. 4F. Accordingly, the thin film transistor "T" including the gate electrode 80, the semiconductor layer 84 and the source and drain electrodes 86 and 88 is complete.

Referring to FIGS. 3 and 5F, since the data line 70 and the pixel electrode 74 are disposed in the same plane, the pixel electrode 74 should be formed in an inner part of the pixel region rather than the common electrode 62. This is to prevent the electrical interference between the data line 70 and the pixel electrode 74.

In FIGS. 4G, 5G and 6G, a passivation layer 90 that protects the thin film transistor "T" is formed on the whole surface of the substrate 1 to cover the thin film transistor "T" and a pixel electrode 74. The passivation layer 90 is silicon nitride ($SiN_x$) or silicon oxide ($SiO_2$) and it is thicker than the gate insulation layer 82. Thereafter, a portion of the passivation layer 90 is etched using a sixth mask to form a second gate pad contact hole 83b that corresponds to the first gate pad contact hole 83a of FIG. 6E.

As mentioned hereinbefore, the array substrate for use in the conventional IPS-LCD is fabricated though the six mask processes. Among these processes, the process for forming the gate pad electrode and the data pad electrode using a transparent conductive material can be omitted because of reducing the cost of production. Furthermore, the first and second gate and data pad contact holes can simultaneously be formed in the same mask process. Therefore, the array substrate for the conventional IPS-LCD can be formed through four mask processes.

After completing the above-mentioned processes, an annealing process is followed to improve the property of the thin film transistor. Through the process of annealing, the implanted impurity ions can be diffused and activated, and the problem of internal grain defects and the internal stress are removed. Thus, the annealing process improves the electrical properties of the thin film transistor.

After the process of annealing, electrical testing of the gate and data lines and the thin film transistor is performed to ensure the stability of them. Namely, through the electrical tests, the open/short-circuit of the gate and data lines are detected and the operation of the thin film transistor is observed.

The array substrate fabricated by above-processes is then aligned with and attached to the upper substrate with the liquid crystal layer interposed therebetween, i.e., a cell process. However, before attaching the upper substrate to the array substrate and interposing the liquid crystal layer between the upper substrate and the array substrate, alignment layers that align the liquid crystal molecules in a determined direction are formed on the array substrate and the upper substrate. Namely, the cell process includes forming the alignment layer in a preliminary step thereof.

When forming the alignment layer, a polymeric material is applied to the substrate and then cured at a temperature of predetermined condition. Thereafter, the alignment layer is rubbed in a certain direction to orient the liquid crystal molecules.

The heat treatment process of curing the alignment layer is generally executed under the condition of annealing the thin film transistor. Namely, the heat treatment process has the same process condition as the annealing process. However, since these processes are carried out at different times in the array process and the cell process, there are problems of increasing the production cost and time.

SUMMARY OF THE INVENTION

Accordingly, the present invention is directed to an array substrate for an IPS-LCD device that substantially obviates one or more of the problems due to limitations and disadvantages of the related art.

An advantage of the present invention is to provide a method of forming an array substrate for an IPS-LCD device that reduces process steps and time to increase the production yield.

Another advantage of the present invention is to provide an array substrate for a liquid crystal display device that has a structure that reduces a high cost of production.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

In order to achieve these and other advantages, an embodiment in accordance with the principles of the present invention provides an array substrate for in-plane switching liquid crystal display device. The array substrate includes a gate line arranged in a transverse direction on a substrate, the gate line including a gate electrode substantially perpendicular to the gate line; a data line arranged in a direction substantially perpendicular to the gate line, the data line including a source electrode that is parallel with the gate line; a common line arranged substantially parallel with the gate line, the common line including a plurality of common electrodes each substantially parallel with the data line; a gate insulation layer on the substrate, the gate insulation layer covering the gate line, the gate electrode, the common line and the plurality of common electrodes; a semiconductor layer on the gate insulation layer, the semiconductor layer including an active layer and an ohmic contact layer; a pixel connecting line arranged substantially parallel with the gate line, the pixel connecting line including a plurality of pixel electrodes that are parallel with the data line; a drain electrode spaced apart from the source electrode and connected to the pixel connecting line; and an alignment layer on the plurality of pixel electrodes and the source and drain electrodes.

The above-mentioned array substrate further includes a thin film transistor that includes the gate electrode, the semiconductor layer, the source electrode and the drain electrode. This thin film transistor is disposed at the crossing of the gate and data lines.

In the above-mentioned array substrate, the gate insulation layer is a material selected from a group consisting of benzocyclobutene (BCB) and acryl-based resin, whereas the alignment layer is a material selected from a group consisting of polyimide and polyamide. The gate line and the common line include at least aluminum. The data line and the plurality of pixel electrodes are formed of a metallic material selected from a group consisting of molybdenum (Mo), tungsten (W) and chromium (Cr).

In another aspect, an embodiment in accordance with the principles of the present invention provides a method of fabricating an array substrate for in-plane switching liquid crystal display device. The method includes forming a first metal layer on a substrate; patterning the first metal layer using a first mask so as to form a gate line having a gate electrode and a common line having a plurality of common electrodes; forming a gate insulation layer on the substrate to cover the patterned first metal layer; forming a semiconductor layer on the gate insulation layer using a second mask, wherein the semiconductor layer includes an active layer of pure amorphous silicon and an ohmic contact layer of impurity-doped amorphous silicon; forming a second metal layer on the gate insulation layer to cover the semiconductor layer; patterning the second metal layer using a third mask to form a data line having a source electrode, a pixel connecting line having a plurality of pixel electrodes, and a drain electrode that is spaced apart from the source electrode; forming a channel by etching a portion of the ohmic contact layer between the source and drain electrodes; forming an alignment layer over the substrate to cover the patterned second metal layer; and thermal-treating the substrate having the alignment layer and the source and drain electrode.

According to the above-mentioned method, the thermal treatment is performed at a temperature of 200 to 230 degrees centigrade for about 2 to 3 hours in a furnace. Through the thermal treatment, the alignment layer is cured. Further, the thin film transistor including the gate electrode, the semiconductor layer and the source and drain electrodes are annealed during the curing process of the alignment layer.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate an embodiment of the present invention and together with the description serve to explain the principles of that invention.

In the drawings.

DETAILED DESCRIPTION OF THE ILLUSTRATED EMBODIMENTS

Reference will now be made in detail to an illustrated embodiment of the present invention, an example of which is shown in the accompanying drawings. Wherever possible, similar reference numbers will be used throughout the drawings to refer to the same or similar parts.

Figure 1:
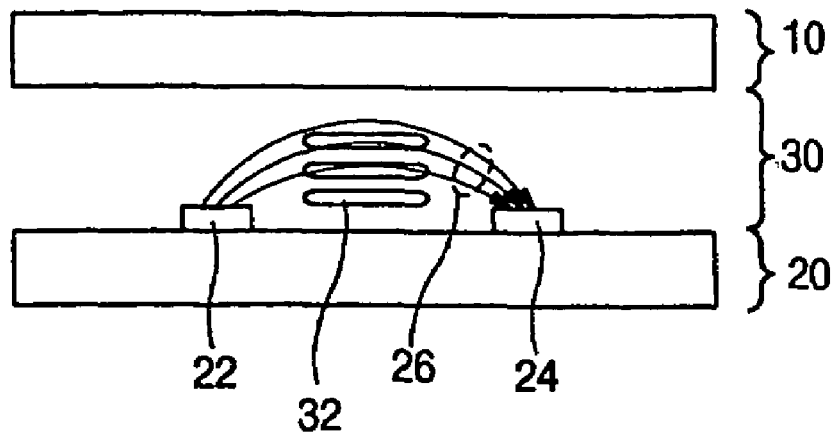
FIG. 1 is a schematic cross-sectional view illustrating a concept of a conventional IPS-LCD panel.
Figure 2A:
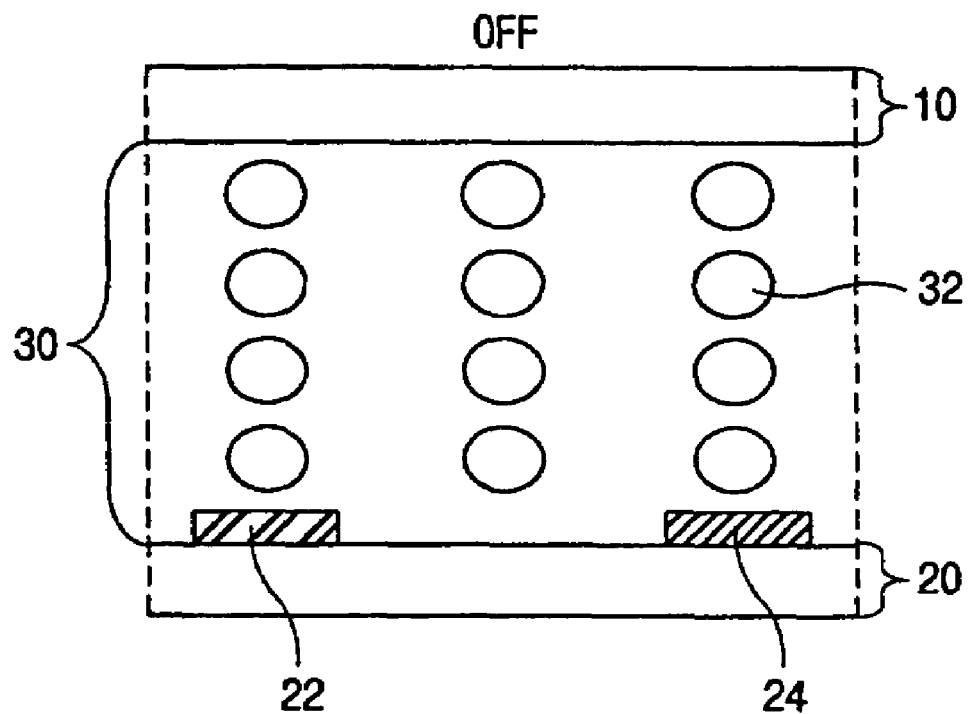
FIGS. 2A and 2B conceptually help illustrate the operation of a conventional IPS-LCD device.
Figure 2B:
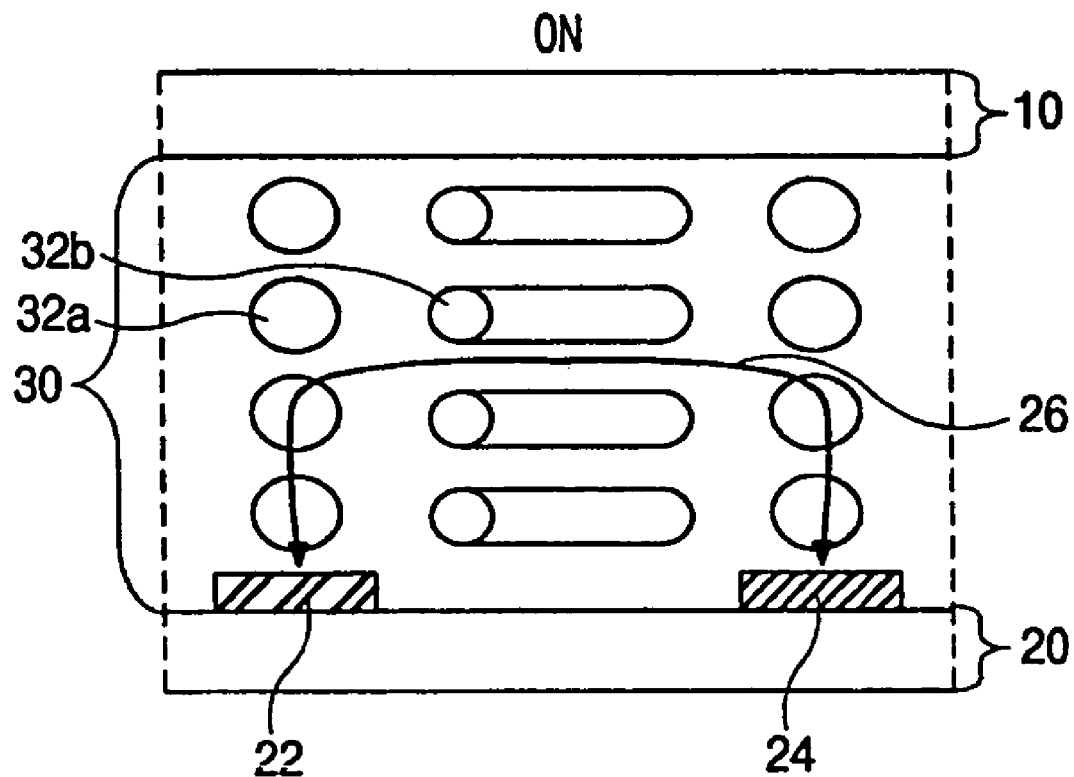
Figure 3:
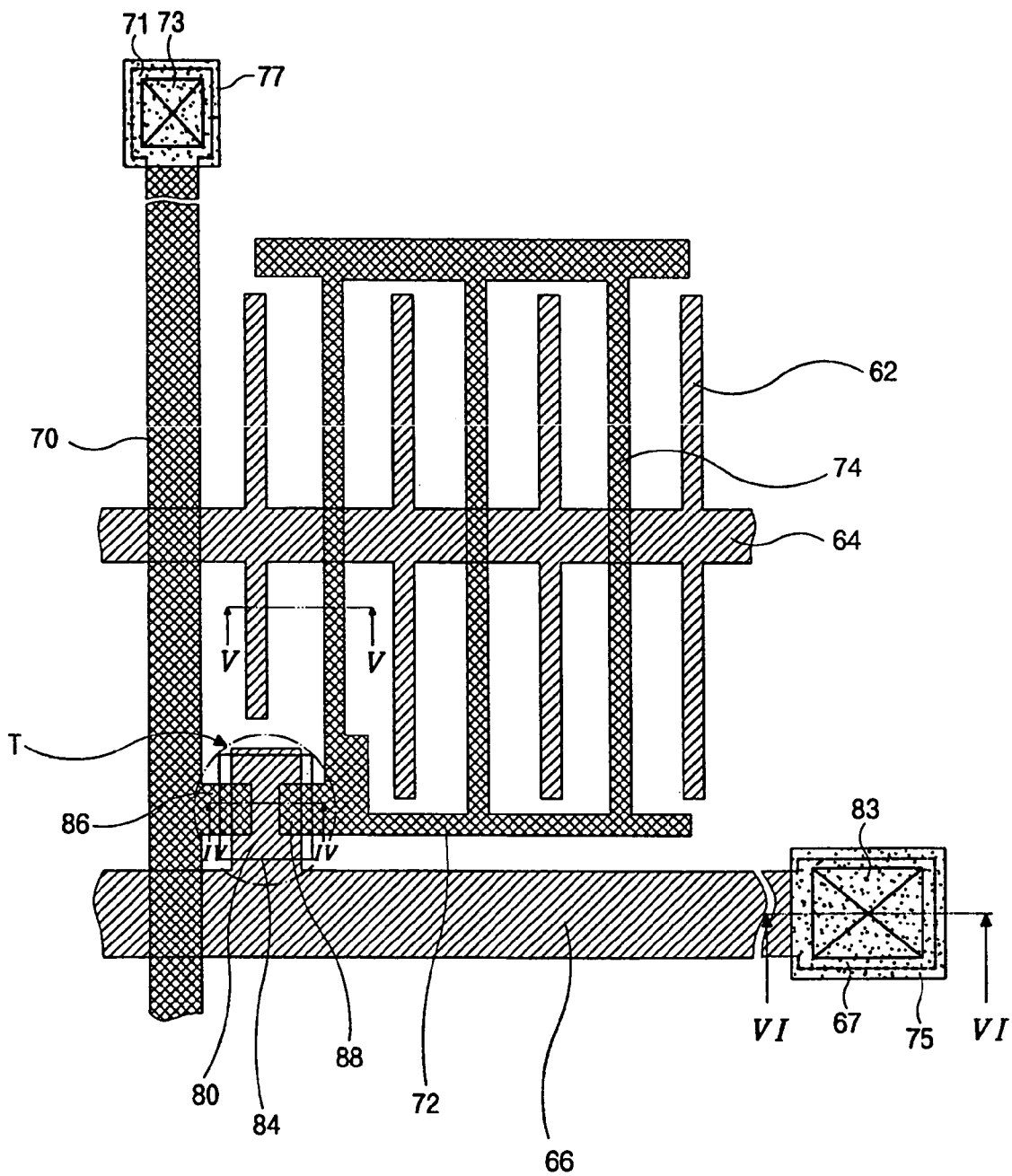
FIG. 3 is a plan view illustrating one pixel of an array substrate according to a conventional IPS-LCD device.
Figure 4A:
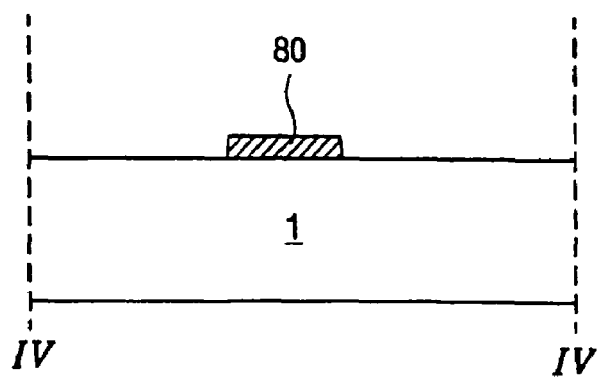
FIGS. 4A to 4G, 5A to 5G and 6A to 6G are cross-sectional views taken along line IV-IV, V-V and VI-VI of FIG. 3, respectively, illustrating process steps of manufacturing the array substrate of conventional IPS-LCD.
Figure 4B:
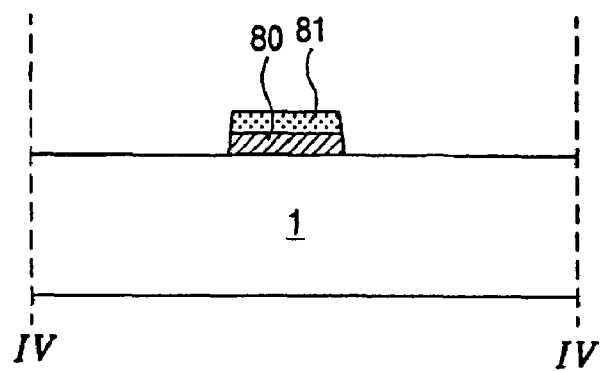
Figure 4C:
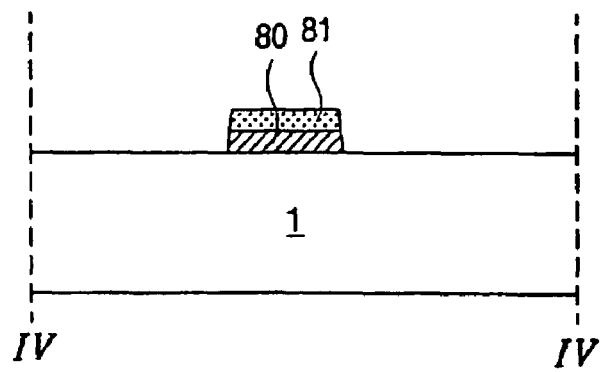
Figure 4D:
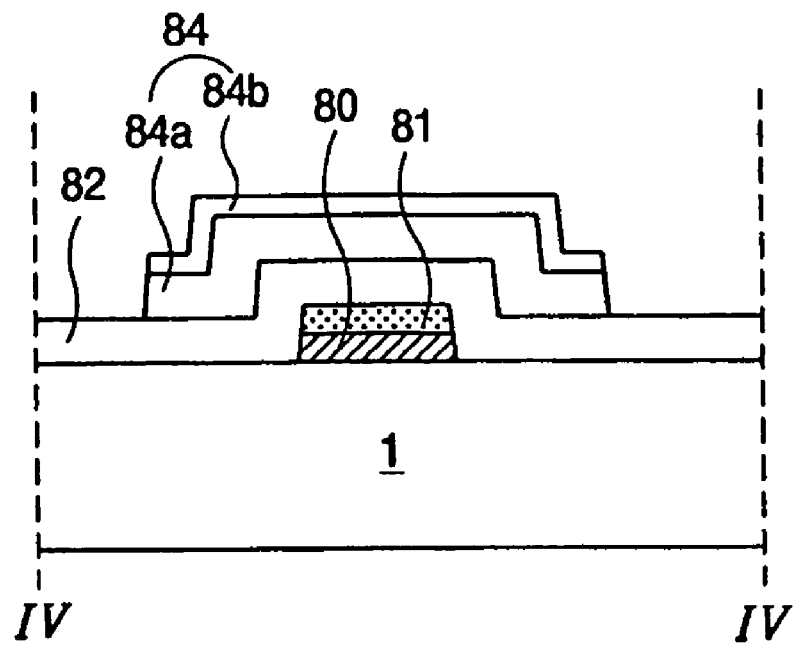
Figure 4E:
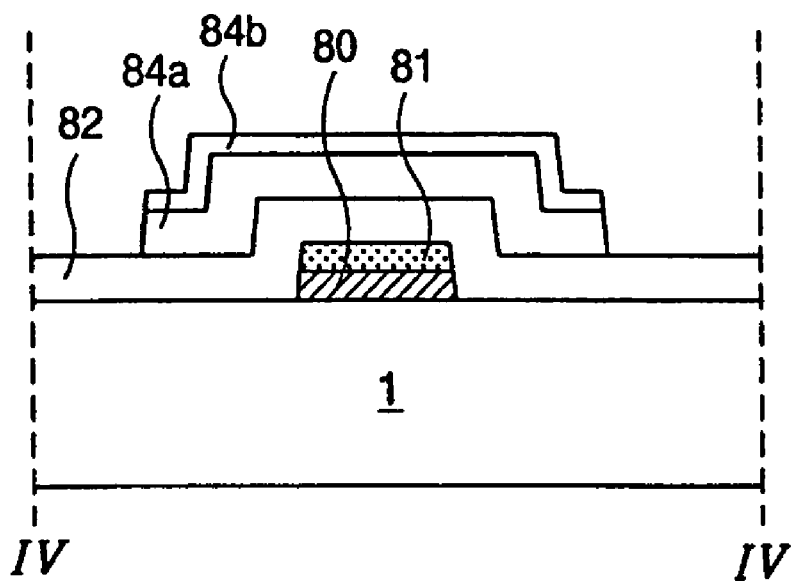
Figure 4F:
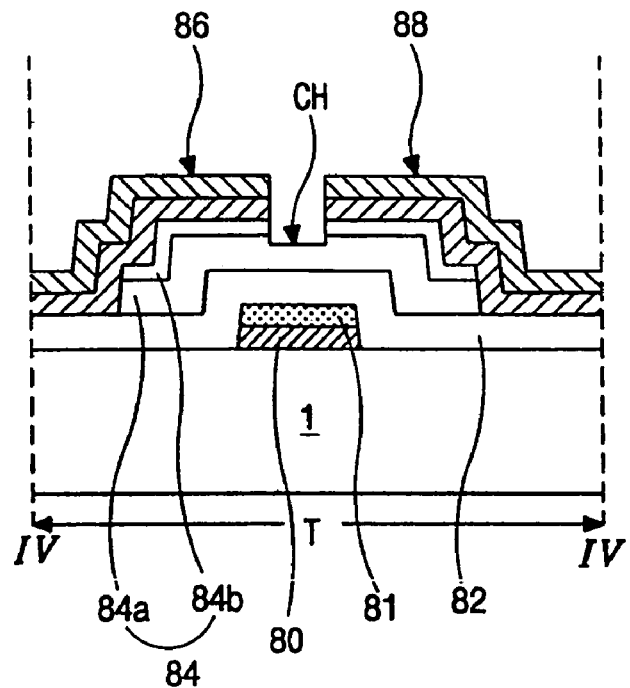
Figure 4G:
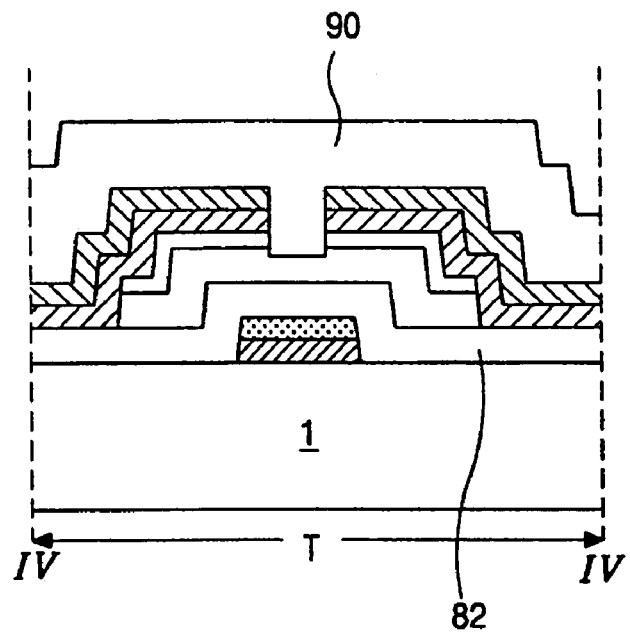
Figure 5A:
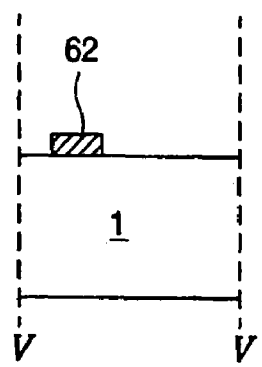
Figure 5B:
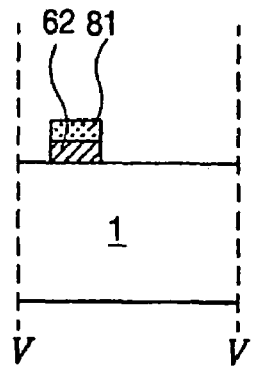
Figure 5C:
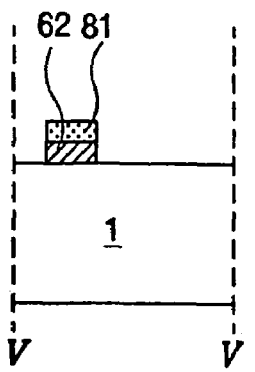
Figure 5D:
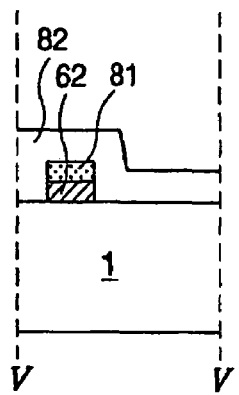
Figure 5E:
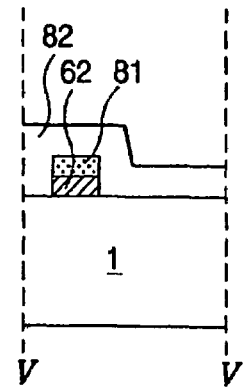
Figure 5F:
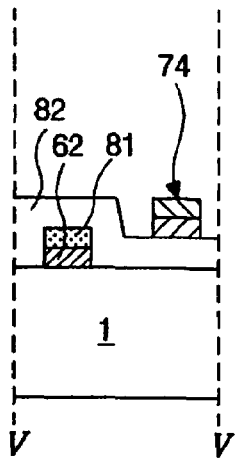
Figure 5G:
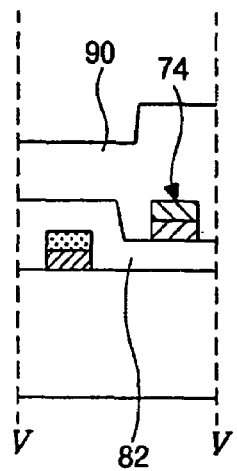
Figure 6A:
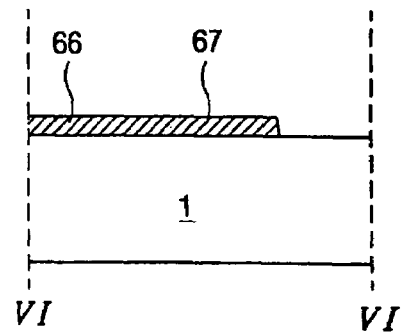
Figure 6B:
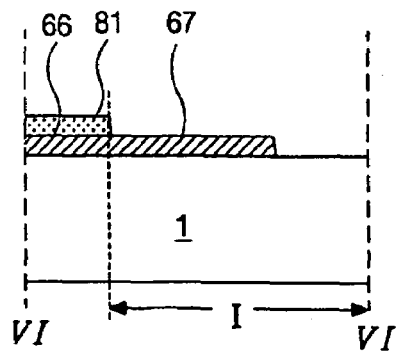
Figure 6C:
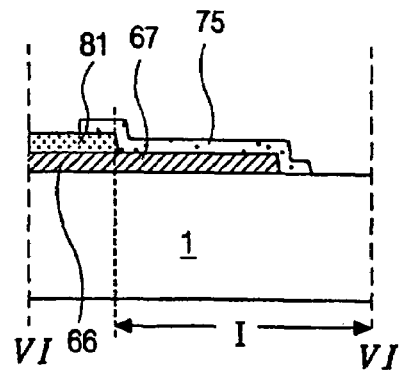
Figure 6D:
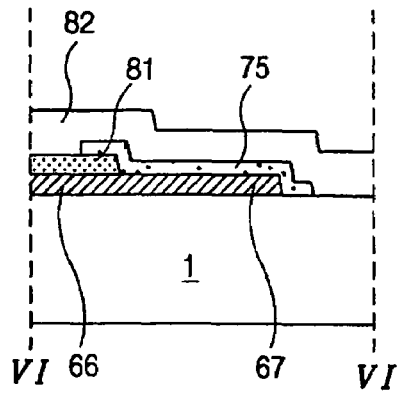
Figure 6E:
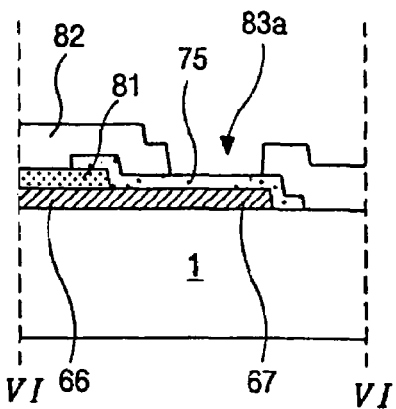
Figure 6F:
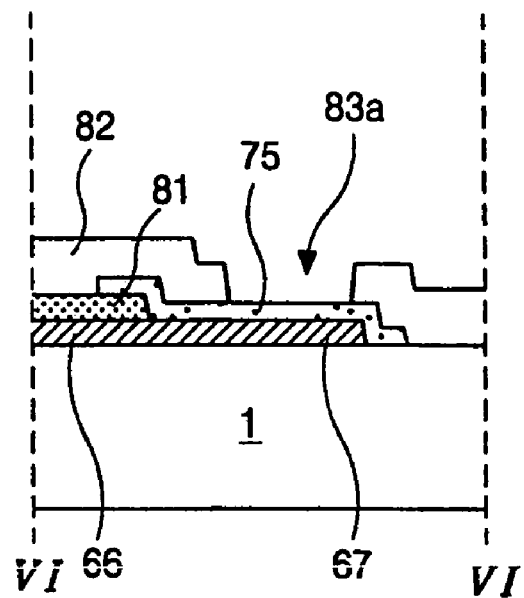
Figure 6G:
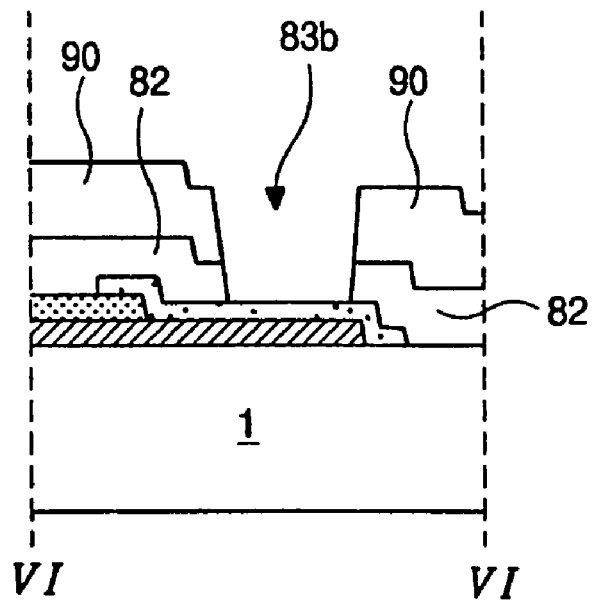
Figure 7:
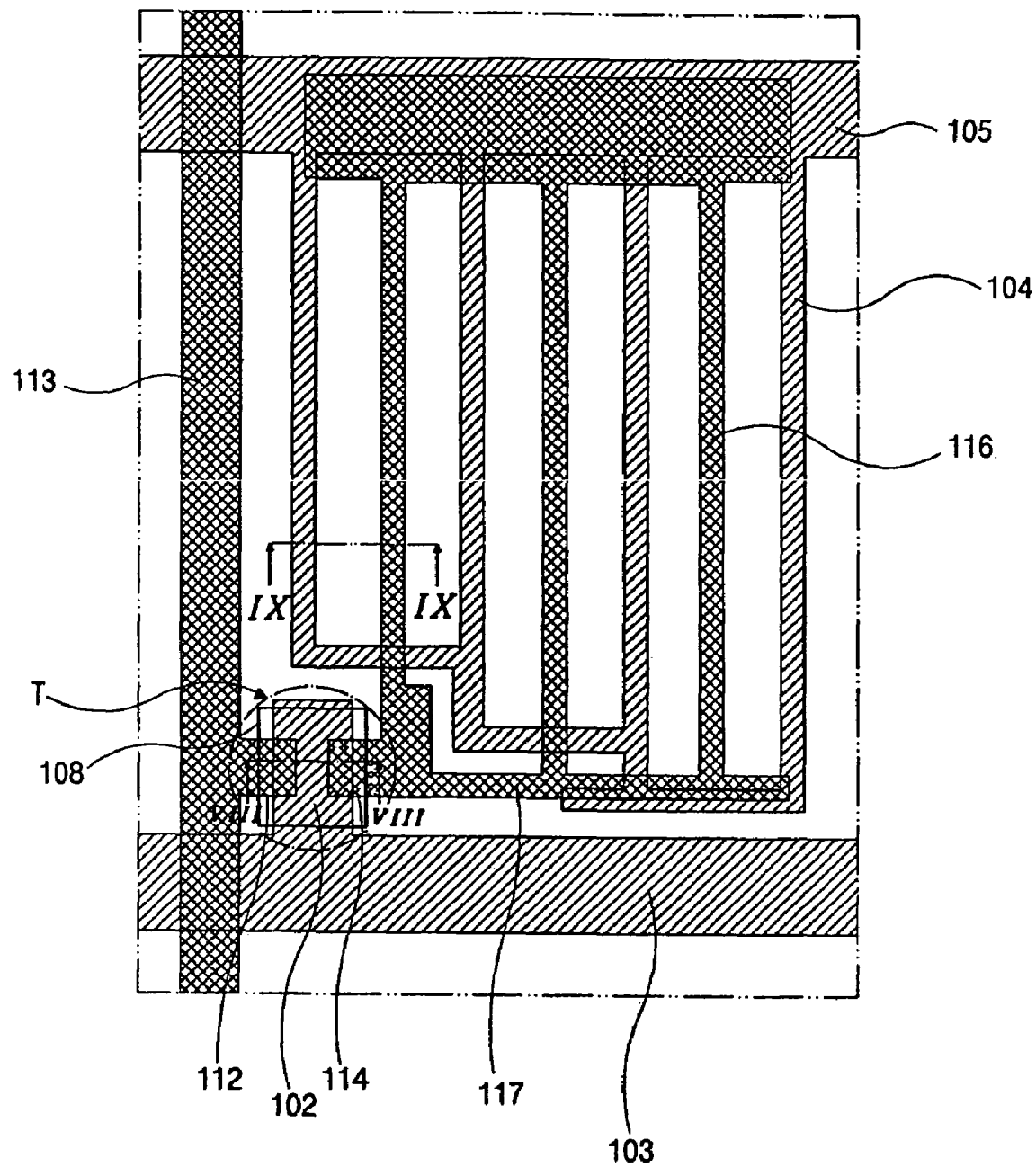
FIG. 7 is a schematic plan view illustrating one pixel of an array substrate of an IPS-LCD according to the present invention.

FIG. 7 is a schematic plan view illustrating one pixel of an array substrate of an IPS-LCD according to the present invention.

As shown, a gate line 103 is transversely arranged and a data line 113 is disposed substantially perpendicular to the gate line 103. A pair of gate and data lines 103 and 113 define a pixel region on the array substrate. An island-shaped semiconductor layer 108 is positioned near the crossing of the gate and data lines 103 and 113, thereby forming a thin film transistor (TFT) "T" with a gate electrode 102, a source electrode 112 and a drain electrode 114. The gate electrode 102 extends from the gate line 103, and the source electrode 112 extends from the data line 113. The drain electrode 114 is spaced apart from the source electrode 112 and connected to a pixel connecting line 117, which is substantially parallel with the gate line 103 and connects a plurality of pixel electrodes 116 to each other. A common line 105 is spaced apart from and disposed substantially parallel with the gate line 103. A plurality of common electrodes 104 protrude from the common line 105 and are disposed substantially parallel with each of the pixel electrodes 116, so that each common electrode 104 is spaced apart from the adjacent pixel electrodes 116 with a predetermined interval therebetween. Although not shown in FIG. 7, gate and data pads are positioned at the ends of the gate and data lines 103 and 113, respectively, for a connection with the external driving circuits (not shown).

According to the present invention, an alignment layer serves as a passivation layer, so that a separate passivation layer is not required to protect the thin film transistor. Hereinafter, the inventive steps of forming an array substrate for IPS-LCD will be explained.

FIGS. 8A to 8D and 9A to 9D are cross-sectional views taken along line VIII-VIII and IX-IX of FIG. 7, respectively, illustrating process steps of manufacturing the array substrate according to the present invention.

Figure 8A:
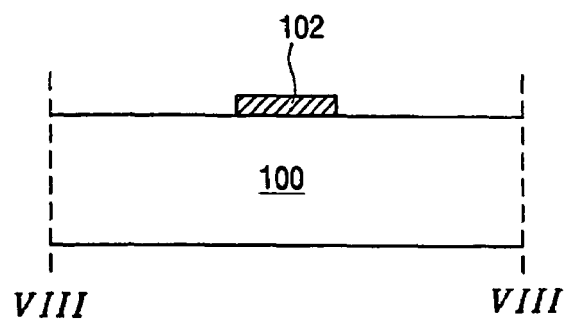
FIGS. 8A to 8D and 9A to 9D are cross-sectional views taken along line VIII-VIII and IX-IX of FIG. 7, respectively, illustrating process steps of manufacturing the array substrate according to the present invention.
Figure 9A:
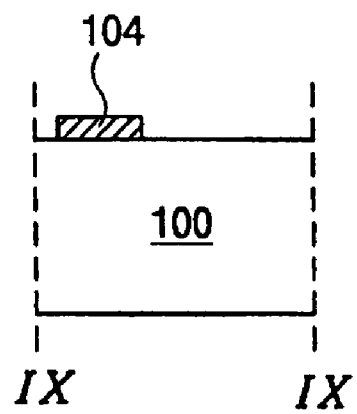

FIGS. 8A and 9A show a step of forming a gate electrode 102 and a common electrode 104 on a substrate 100. A first metal layer is formed on the substrate 100 and then patterned to form the gate electrode 102 and the common electrode 104 using a first mask. At this time, although not shown in FIGS. 8A and 9A, the gate and common lines (see references 103 and 105 of FIG. 7) are also formed with the gate electrode 102. The material for the first metal layer is pure aluminum or at least aluminum-included alloy. Alternatively, the first metal layer can have a double-layered structure that has aluminum-included material as a first layer and chromium (Cr), molybdenum (Mo), tantalum (Ta), tungsten (W), antimony (Sb) or titanium (Ti) as a second layer.

Figure 8B:
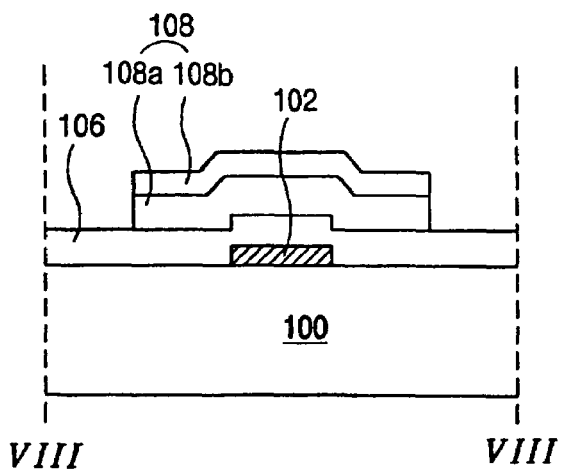
Figure 9B:
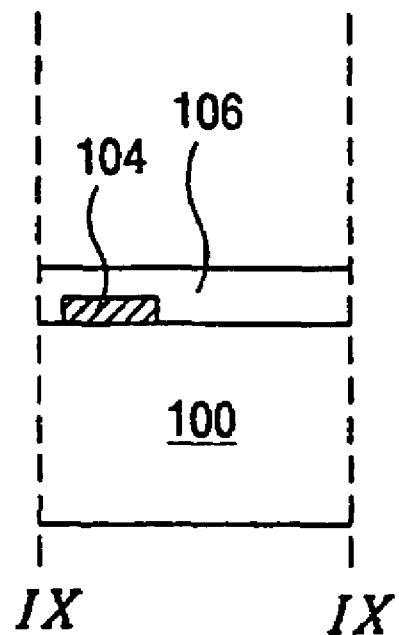

As shown in FIGS. 8B and 9B, a gate insulation layer 106 is formed on the substrate 100 to cover the patterned first metal layer. The gate insulation layer 106 may be selected from silicon nitride ($SiN_x$), silicon oxide ($SiO_2$), benzocyclobutene (BCB), acryl-based resin and the like. But it is recommended that an organic material, such as benzocyclobutene (BCB) or acrylic resin, be used for the gate insulation layer 106, because the organic material is easy to form gate and data pad contact holes using direct drawing instead of the photolithography process.

Thereafter, a pure amorphous silicon (a-Si:H) and an impurity-doped amorphous silicon ($n^+$ a-Si:H) are sequentially formed on the gate insulation layer and then simultaneously patterned using a second mask to form an active layer 108a and an ohmic contact layer 108b over the gate electrode 102. The ohmic contact layer 108b reduces the contact resistance between the active layer 108a and the later formed source and drain electrodes, because the impurity-included amorphous silicon increases the electron mobility.

When forming the gate pad contact hole, although not shown in FIGS. 8B and 9B, the direct drawing method is employed. Namely, when forming the gate insulation layer 106 by way of depositing silicon nitride ($SiN_x$) or by way of spin-coating the organic material, the mask for the gate insulation layer is arranged to cover the gate pad portion. Then, the gate pad portion covered by the mask becomes the gate pad contact hole because the organic material or silicon nitride ($SiN_x$) is not formed on the gate pad portion. At this point, the direct drawing does not produce the minute patterns, compared with the photolithography process. Thus, it is difficult to adopt the patterns produced by the direct drawing method into the device that needs the minute patterns. However, the direct drawing method has an advantage of reducing the production cost and time rather than the photolithography method. In the direct drawing for forming the gate insulation layer with the gate pad contact hole, the mask only covers the portion for the contact hole, and then such an organic material is directly printed on the whole surface of the substrate 100. Therefore, the gate insulation layer having the gate pad contact hole is formed. Although the photolithography method requires the exposure process and etching process to form the contact hole, the direct drawing method does not require these exposure and etching processes.

Figure 8C:
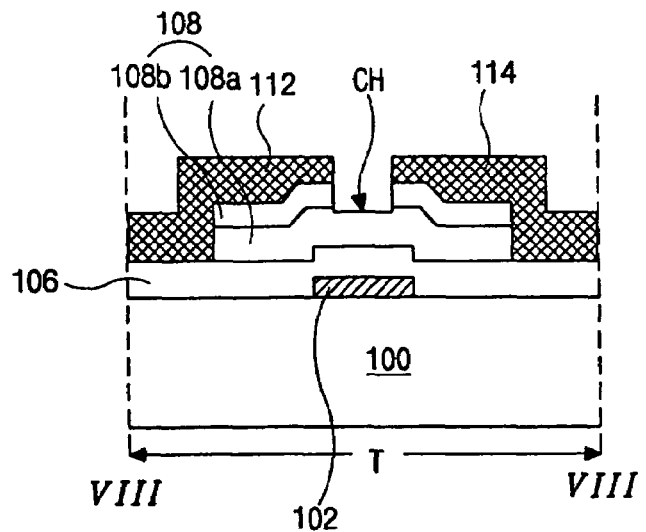
Figure 9C:
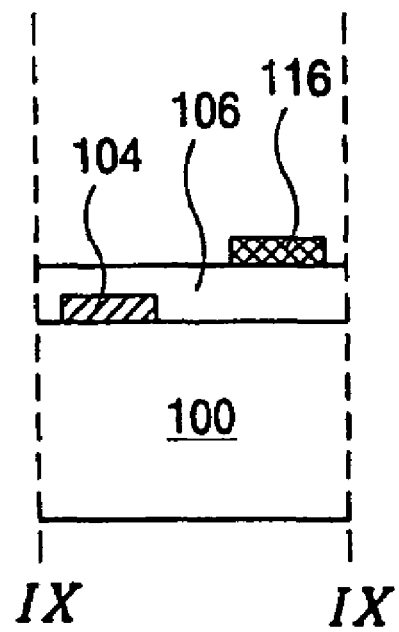

FIGS. 8C and 9C show a step of forming a source electrode 112, a drain electrode 114 and a pixel electrode 116. As shown in FIGS. 8C and 9C, a second metal layer is formed on the gate insulation layer 106 and then patterned using a third mask to form the source electrode 112, the drain electrode 114 and the pixel electrode 116. At this time, although not shown in FIGS. 8C and 9C but shown in FIG. 7, the data line 113 and the pixel connecting line 117 are also formed with the source and drain electrodes 112 and 114. The second metal layer is a material selected from molybdenum (Mo), tungsten (W), chromium (Cr) and the like. Alternatively, the second metal layer can have a double-layered structure that includes aluminum (Al), tantalum (Ta), antimony (Sb), titanium (Ti) and an alloy thereof.

Thereafter, a portion of the ohmic contact layer 108b disposed upon the active layer 108a is etched using the source and drain electrodes 112 and 114 as masks, thereby forming a channel "CH" in an interval between the source electrode 112 and the drain electrode 114. Accordingly, the thin film transistor "T" including the gate electrode 102, the semiconductor layer 108 and the source and drain electrodes 112 and 114 is complete. Further at this time of forming the channel "CH", the ohmic contact layer 108b is over-etched to the active layer 108a in order to obtained the better switching characteristics in the thin film transistor "T".

Now referring to FIGS. 7 and 9C, since the data line 113 and the pixel electrodes 116 are disposed in the same plane, the pixel electrodes 116 should be formed in an inner part of the pixel region rather than the common electrodes 114. This is to prevent the electrical interference between the data line 117 and the pixel electrodes 116.

As described before, the thin film transistor "T" is formed through a process having only three masks, contrary to the conventional art. Thus, it is possible to decrease the production cost and time and to increase the yield of the array substrate.

Figure 8D:
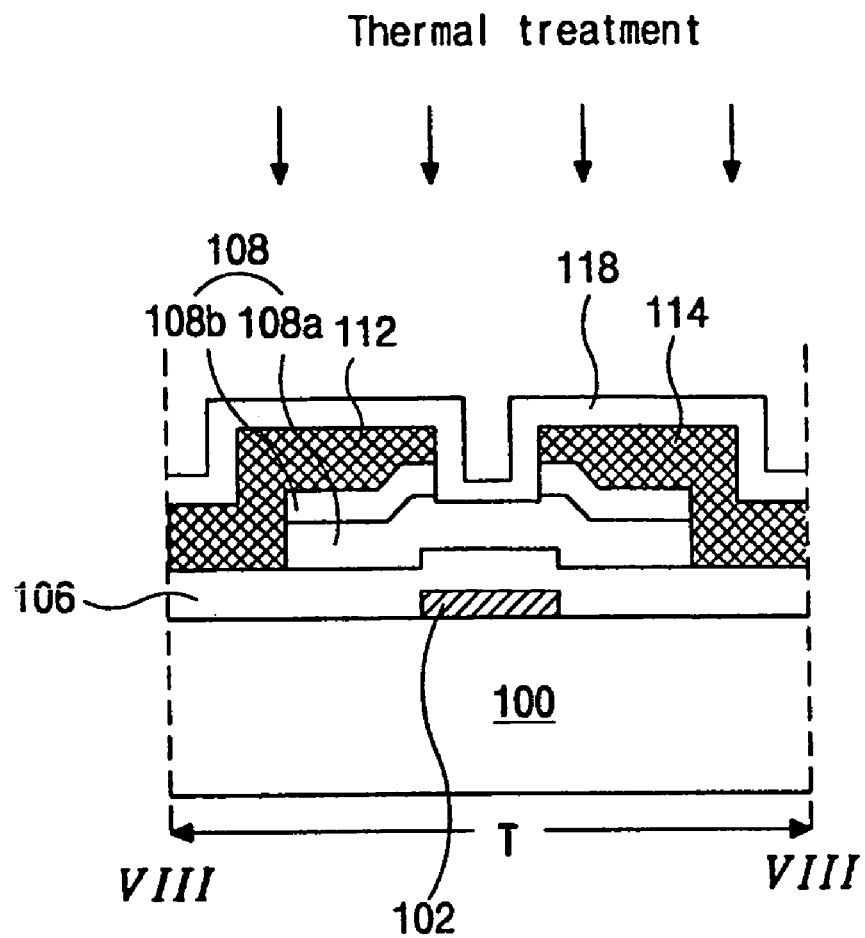
Figure 9D:
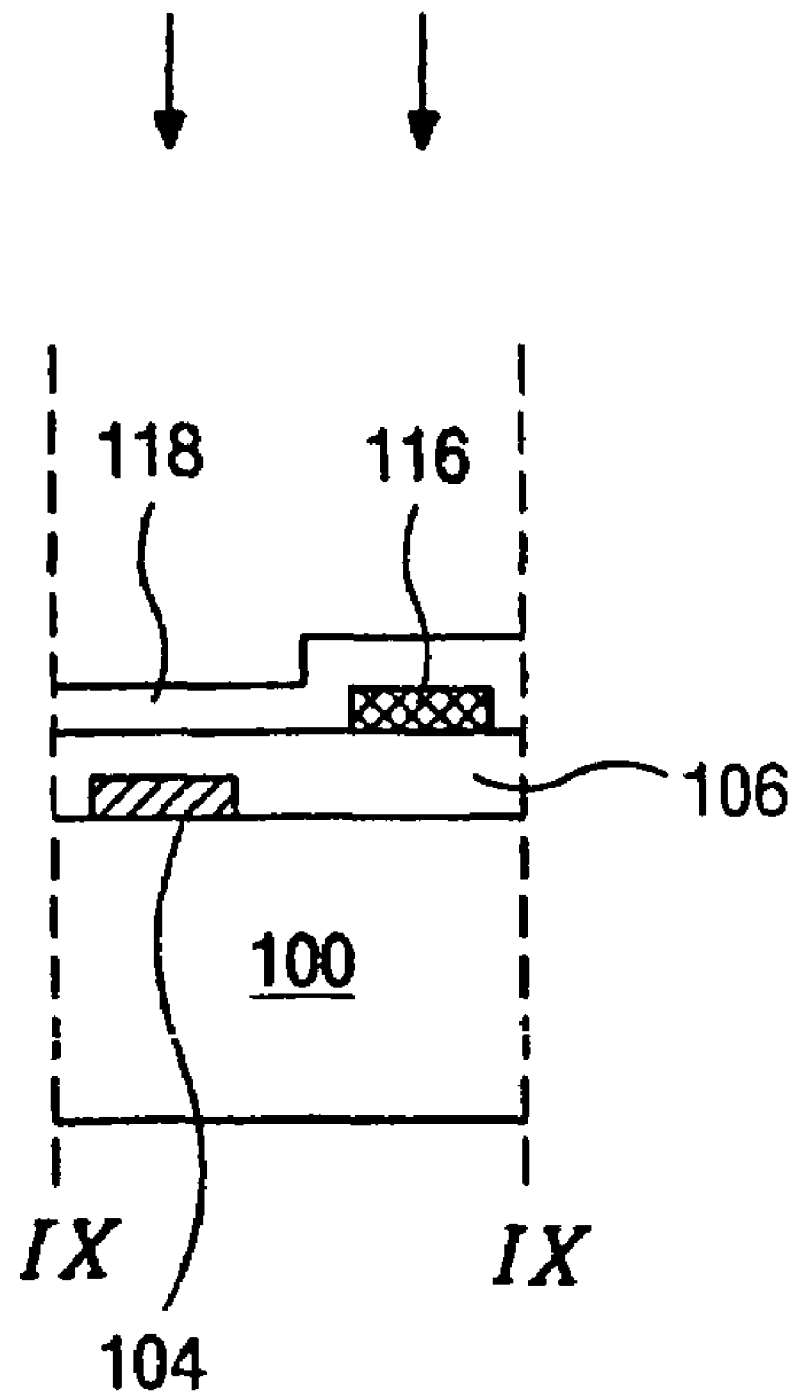

FIGS. 8D and 9D show a step of forming an alignment layer 118 over the substrate 100. As shown, the alignment layer 118 is formed on the gate insulation layer 106, thereby covering the thin film transistor "T" and the pixel electrode 116. The alignment layer 118 is a polymeric compound, such as polyimide or polyamide. The alignment layer 118 makes the liquid crystal molecules have a uniformly orientational direction in order to properly drive the IPS-LCD device and to obtain the excellent display images.

In the step of forming the alignment layer 118, it is very important that the alignment layer 118 is invariably and uniformly formed all over the surface of the substrate 100. To achieve the uniform alignment layer 118, the substrate having the alignment layer 118 is cured in the dryer and furnace. The curing process is performed at a temperature of about 230 degrees centigrade (° C.) for about 2 to 3 hours. Meanwhile, this thermal treatment for curing the alignment layer 118 has the same process condition as annealing the thin film transistor. That is it is possible that the curing process for the alignment layer and the annealing process for the thin film transistor can be performed at the same process step, thereby resulting in the decrease of the process steps. Accordingly, the alignment layer is formed upon the thin film transistor instead of the passivation layer, so that the alignment layer acts as not only aligning the liquid crystal molecules, but also protecting the thin film transistor. Furthermore, when curing the alignment layer, the annealing process for the thin film transistor can be performed at the same time. Namely, by omitting the annealing process when forming the array substrate and by simultaneously performing the annealing and curing processes, the process time can be shortened.

After the curing process, the alignment layer 118 is rubbed in a direction of about 5 to about 45 degrees from the common and pixel electrodes 104 and 116, thereby orienting the liquid crystal molecules in the same direction of about 5 to about 45 degrees. Then, electrical testing of the gate and data lines and the thin film transistor is performed to ensure the stability of them. Namely, through the electrical tests, the open/short-circuit of the gate and data lines is detected and the operation of the thin film transistor is observed.

Although not shown in the drawings, the upper substrate is fabricated to be attached to the array substrate. The upper substrate has red (R), green (G) and blue (B) color filters corresponding to the pixel regions of the array substrate. In a position corresponding to the gate and data lines, the upper substrate includes a black matrix. The upper substrate can further includes a transparent conductive layer on the color filters and black matrix in order to prevent static electricity.

Moreover, the liquid crystal molecules can have a negative dielectric anisotropy, or chiral dopant can be added into the liquid crystal layer to improve the response time.

According to the present invention, other objects and advantages will become clear from the detailed description and examples which are alluded before. First, since the alignment layer substitutes for the passivation layer, the three-mask process is possible, thereby decreasing the process steps of forming the array substrate for IPS-LCD. Second, since the curing process for the alignment layer and the annealing process for the thin film transistor are simultaneously performed at the same process step, it is possible that the decrease of process time is obtained. Third, due to the decrease of the process time and mask process, the cost of production is reduced and the yield can be increased.

It will be apparent to those skilled in the art that various modifications and variation can be made in the array substrate of the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching liquid crystal display device, comprising:
    a gate line arranged in a transverse direction on a substrate, the gate line including a gate electrode and a gate pad at an end of the gate line, wherein the gate pad is formed of a same material and in a same layer as the gate electrode;
    a data line arranged in a direction substantially perpendicular to the gate line, the data line including a source electrode;
    a common line arranged parallel with the gate line, the common line including a plurality of common electrodes substantially parallel with the data line;
    a common connecting line connecting the plurality of common electrodes, wherein the common connecting line has a stairs shape such that the common connecting line has first, second and third portions each substantially parallel with the gate line, and wherein the plurality of common electrodes have different lengths by the first, second and third portions;
    a gate insulation layer on the substrate, the gate insulation layer having a gate pad contact hole and covering the gate line, the gate electrode, the common line and the plurality of common electrodes, wherein the gate pad is exposed via the gate pad contact hole in only the gate insulation layer;
    a semiconductor layer on the gate insulation layer;
    a plurality of pixel electrodes arranged substantially parallel with the data line;
    a pixel connecting line substantially parallel with the gate line and connecting the plurality of pixel electrodes to each other, the pixel connecting line overlapping the third portion of the common connecting line;
    a drain electrode spaced apart from the source electrode, the drain electrode directly contacting the semiconductor layer, wherein the drain electrode has the same layer as the plurality of pixel electrodes; and
    an alignment layer directly on and contacting the plurality of pixel electrodes, the source and drain electrodes and the gate insulating layer, whereby the alignment layer protects the pixel electrodes, the source and drain electrodes and the gate insulating layer, wherein the alignment layer the source and drain electrodes are simultaneously heat-treated.

2. The device of claim 1, wherein the gate line and the common line include at least aluminum.

3. The device of claim 1, wherein the data line and the plurality of pixel electrodes are formed of one of molybdenum (Mo), tungsten (W) and chromium (Cr).

4. The device of claim 1, wherein the drain electrode is connected to the pixel connecting line.

* * * * *